United States Patent [19]

Nomura

[11] Patent Number: 4,996,665
[45] Date of Patent: Feb. 26, 1991

[54] METHOD AND DEVICE FOR EDITING A DOCUMENT HAVING A PLURALITY OF HEADINGS

[75] Inventor: Takaaki Nomura, Yokohama, Japan

[73] Assignee: Hitachi Ltd., Tokyo, Japan

[21] Appl. No.: 227,653

[22] Filed: Aug. 3, 1988

[30] Foreign Application Priority Data

Aug. 5, 1987 [JP] Japan .................. 62-194470

[51] Int. Cl.$^5$ .......................... G06F 7/28; G06F 7/10
[52] U.S. Cl. .................. 364/900; 364/962;
364/962.1; 364/963; 364/963.4; 364/943; 364/943.1
[58] Field of Search ... 364/200 MS File, 900 MS File

[56] References Cited

U.S. PATENT DOCUMENTS

| | | | |
|---|---|---|---|
| Re. 32,130 | 4/1986 | Frederiksen | 364/900 |
| 4,041,463 | 8/1977 | Slutzky | 364/900 |
| 4,435,778 | 3/1984 | Cason | 364/900 |
| 4,451,900 | 5/1984 | Mayer | 364/900 |
| 4,513,391 | 4/1985 | Maddock | 364/900 |
| 4,539,653 | 9/1985 | Bartlett | 364/900 |
| 4,559,598 | 12/1985 | Goldwasser | 364/900 |
| 4,595,997 | 6/1986 | Parmet | 364/900 |
| 4,601,003 | 7/1986 | Yoneyama | 364/900 |
| 4,641,274 | 2/1987 | Swank | 364/900 |
| 4,716,543 | 12/1987 | Ogawa et al. | 364/900 |
| 4,813,010 | 3/1989 | Okamoto | 364/900 |
| 4,868,733 | 9/1989 | Fujisawa | 364/200 |

FOREIGN PATENT DOCUMENTS

60-17522 of 1985 Japan .

*Primary Examiner*—David Y. Eng
*Assistant Examiner*—Eric Coleman
*Attorney, Agent, or Firm*—Fay, Sharpe, Beall, Fagan, Minnich & McKee

[57] ABSTRACT

A document editing device for editing a document having a hierarchial structure by sets of element which share definition information on existence and format of serial number and heading title of a text which includes chapters and sections, comprises a document data memory for storing text data with a control character indicating the modification of a hierarchial level of the set and a control character indicating the end of each element being added to a position in the text data corresponding to the heading, and a management information memory for storing management information for each set and each element separately from the text data. When the text data is to be displayed or printed, the control character is detected from the text read from the document data memory, the serial number and title corresponding to the detected control character are read from the management information memory and they are outputted in place of the control character.

4 Claims, 8 Drawing Sheets

| | 1 | 2 | 3 |
|---|---|---|---|
| 5a — SET IDENTIFIER | | | |
| 5b — SET NAME | | | |
| 5c — PARENT ELEMENT IDENTIFIER | | | |
| 5d — FIRST ELEMENT IDENTIFIER | | | |
| 5e — LAST ELEMENT IDENTIFIER | | | |
| 5f — EXISTENCE OF ELEMENT NAME | | | |
| 5g — EXISTENCE OF SERIAL NUMBER | | | |
| 5h — FORMAT OF SERIAL NUMBER | | | |
| 5i — NUMERAL TYPE OF SERIAL NUMBER | | | |

FIG. 6

| | | | |
|---|---|---|---|
| 6a — ELEMENT IDENTIFIER | | | |
| 6b — ELEMENT NAME (TITLE) | | | |
| 6c — PAGE NO OF FIRST LINE | | | |
| 6d — LINE NO OF FIRST LINE | | | |
| 6e — PAGE NO OF LAST LINE | | | |
| 6f — LINE NO OF LAST LINE | | | |
| 6g — SET IDENTIFIER | | | |
| 6h — PRECEDING ELEMENT IDENTIFIER | | | |
| 6i — SUCCEEDING ELEMENT IDENTIFIER | | | |
| 6j — CHILD SET IDENTIFIER | | | |

FIG. 7

METHOD AND DEVICE FOR EDITING A DOCUMENT HAVING A PLURALITY OF HEADINGS

BACKGROUND OF THE INVENTION

1. Field of the Invention

The present invention relates to an editing method of a document having a hierarchical structure of chapters and sections by using a document processing system such as a word processor, and a device therefor.

2. Description of the Prior Art

A word processor usually comprises an input device, a memory, a display and a printer, and displays input document data on the display for editing such as correction, addition and deletion of characters.

The document to be processed has, in many cases, an array of hierarchical structure such as chapters and sections as will be discussed in detail below.

A method for efficiently editing the document by utilizing the hierarchical structure has been proposed (see JP-A-60-17522). However, since the proposed document editing device relates to a technique to detect a heading of a chapter or section in the text data inputted by a user of the device, it cannot process the document in the following case.

In the document having the hierarchical structure, a heading (normally a serial number and a heading title) is, in many cases, added at the beginning of chapter, section or sub-section.

When a display format of characters or symbols representing the serial number of the text data having the headings is to be changed, the headings of all of the corresponding chapters and the headings of all sections and subsections which include the chapter numbers of those chapters in the serial numbers must be searched for correction. Accordingly, a long correction time is required.

SUMMARY OF THE INVENTION

It is a primary object of the present invention to provide an editing method which efficiently edits text data of a document having an hierarchical structure.

It is another object of the present invention to provide a document editing method which collectively corrects and amend headings of chapters, sections and subsections of a document having a hierarchical structure of chapters, sections and subsections.

It is a further object of the present invention to provide a document editing device adapted to realize the above method.

In order to achieve the above objects of the present invention in the device comprising an input device for inputting text data and commands for indicating functions of a processor, a data memory for storing text data and an output device for displaying a document based on the text data, the document editing method comprises the steps of storing in the memory at least one set of control characters indicating change of level of the hierarchical structure of the document and a control character indicating the end of element text data of the level, instead of the heading of the text, when the text data is stored in the memory; storing, in a management information memory, management information for sets and elements of the levels of the text, and when the control character is read from the document data memory to edit the document, converting the text data to heading data by using the management information read from the management information memory and outputting the heading data to the display or printer.

In accordance with the present invention, when the document is edited by the word processor and the display formats of the serial numbers and titles of the headings of chapters and sections of the text are to be collectively changed, only the definition information on the display of the serial numbers and titles stored in the management information memory need be changed. Accordingly, the operation is very simple.

In the document data memory, each heading element is represented by the control character and the control character is substituted by the element heading when the text is outputted (i.e. printed or displayed). Accordingly, there is no need for amendment of the document data memory.

The above and other features and objects of the present invention will become more apparent by reference to the following description taken in conjunction with the accompanying drawings.

DESCRIPTION OF THE PREFERRED EMBODIMENTS

Figure 1:
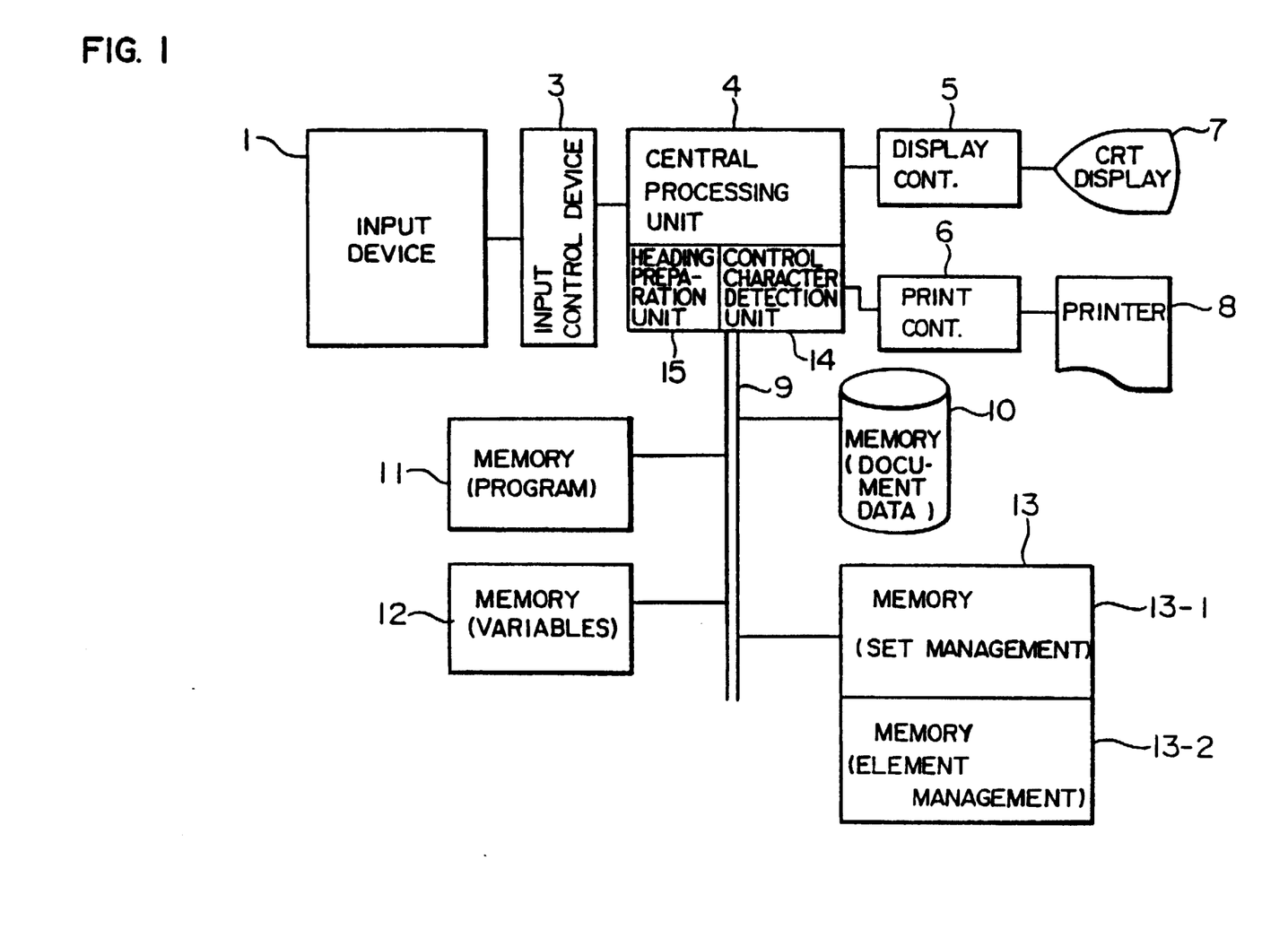
FIG. 1 shows a block diagram of one embodiment of a document editing device of the present invention.

FIG. 1 shows a block diagram of one embodiment of a text editing device of the present invention.

Numeral 1 denotes an input device for inputting document data and document editing commands. The character and command data from the input device 1 are converted to code data corresponding to the keys of the input device 1 by an input control device 3 and the code data are supplied to a processor or central processing unit 4 such as a microcomputer. Numerals 11, 12 and 13 denote memories. The memory 11 is a ROM (read-only memory) which stores a program necessary to operate the processor, and the memory 12 stores variables for editing the document. The memory 12 may be integral with the memory 11.

Figure 4:
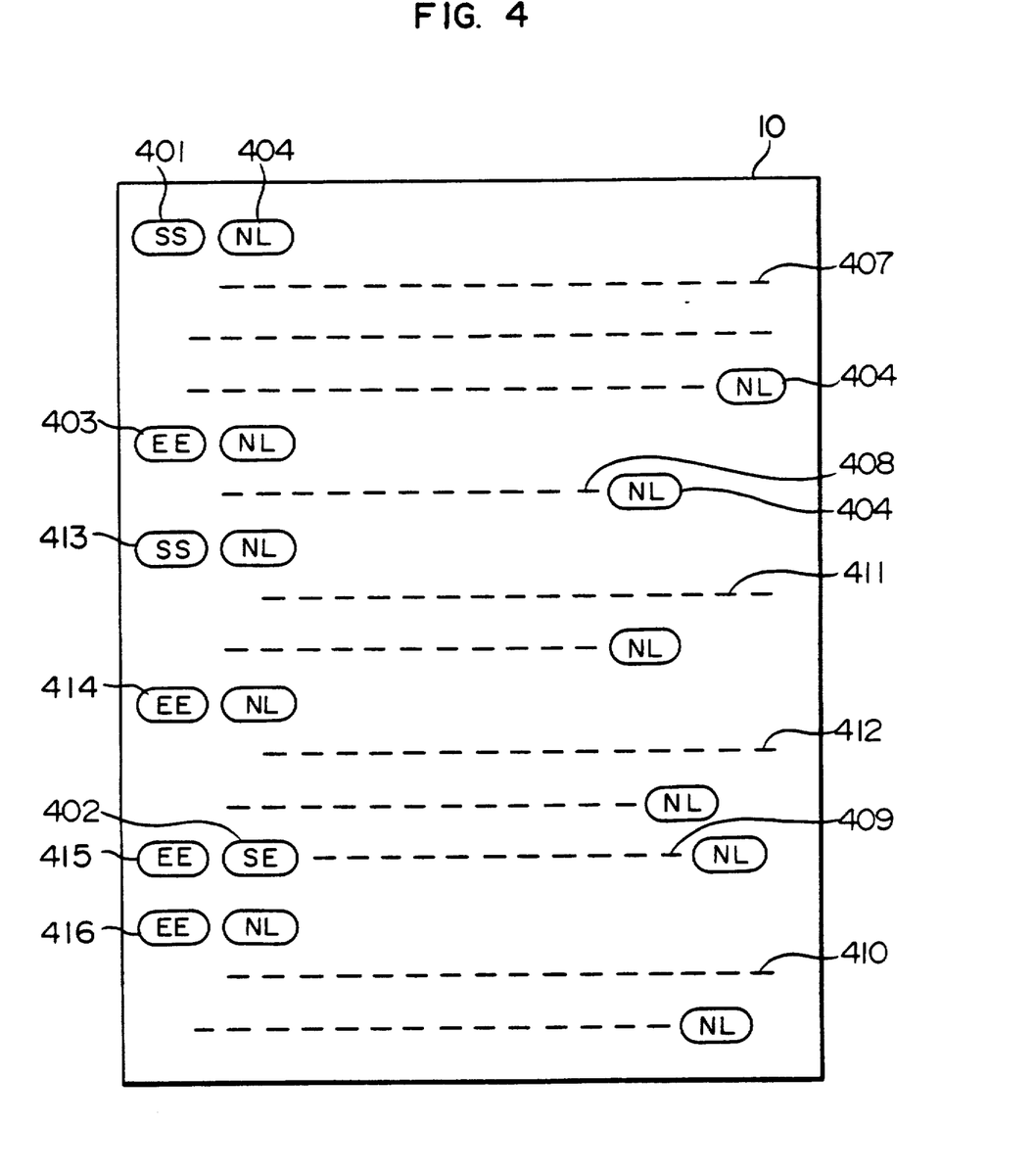
FIG. 4 shows the content of the document data memory of the document editing device of FIG. 1.

The memory 10 stores document data shown in FIG. 4 and layout information. The memory 13 stores management information and has a collective management information memory 13-1 shown in FIG. 5 and an element management information memory 13-2 shown in FIG. 6. The memory bus 9 connects the processor and the memories 10, 11, 12 and 13.

Numeral 5 denotes a display control device for generating image data to be displayed on a display 7, and numeral 6 denotes a print control unit for printing the edited document by a printer 8.

In order to make it easy to understand the explanation of the present invention, the content of the document to be edited by the present invention is now explained.

Figure 2:
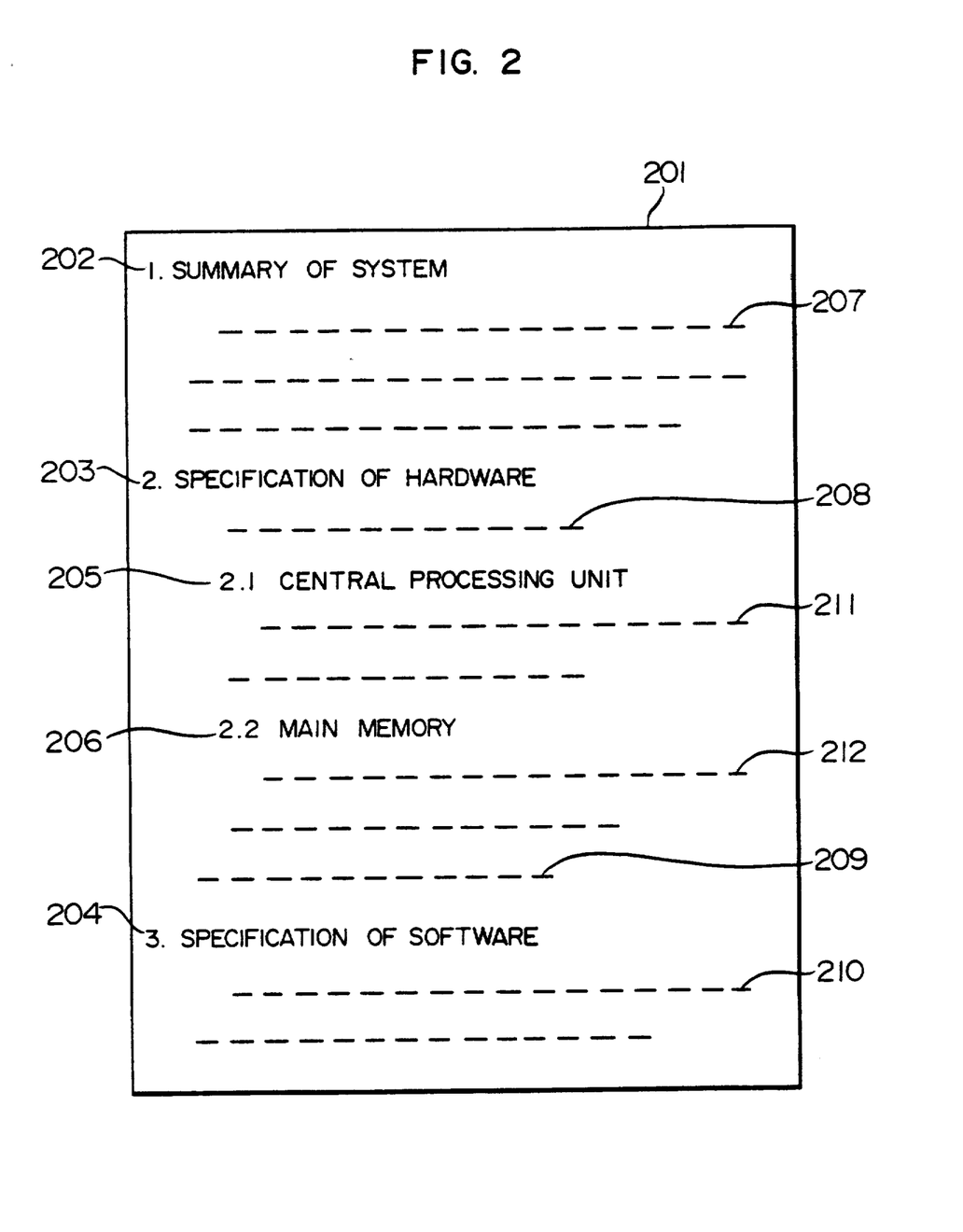
FIG. 2 shows an example of display of a document page having a hierarchical structure.

FIG. 2 shows an example of display (or printout) of a document page 201 having a hierarchical structure of chapters and sections. Numerals 202 to 204 denote heading lines for Chapters 1 to 3, respectively, and numerals 207, 208, 209 and 210 denote text data (primarily characters) of the respective chapters. Numerals 205 and 206 denote heading lines for Sections 1 and 2 of the Chapter 2, and numerals 211 and 212 denote text data of the respective sections. In the present example, the chapter headings 202 to 204 each includes a chapter title and a chapter serial number having a format of: (chapter number) followed by "."; the section headings 205 and 206 each includes a section title and a section serial number having a format of: (chapter number) followed by "." followed by (section number). The chapter number and section number are represented by Arabic numerals.

Since the hierarchical structure of the document including chapters and sections and the expression format of the headings of the chapters and sections differ depending on the type of document and a writer, it is necessary that a user of the document editing device can define them in any desired manner.

Figure 3:
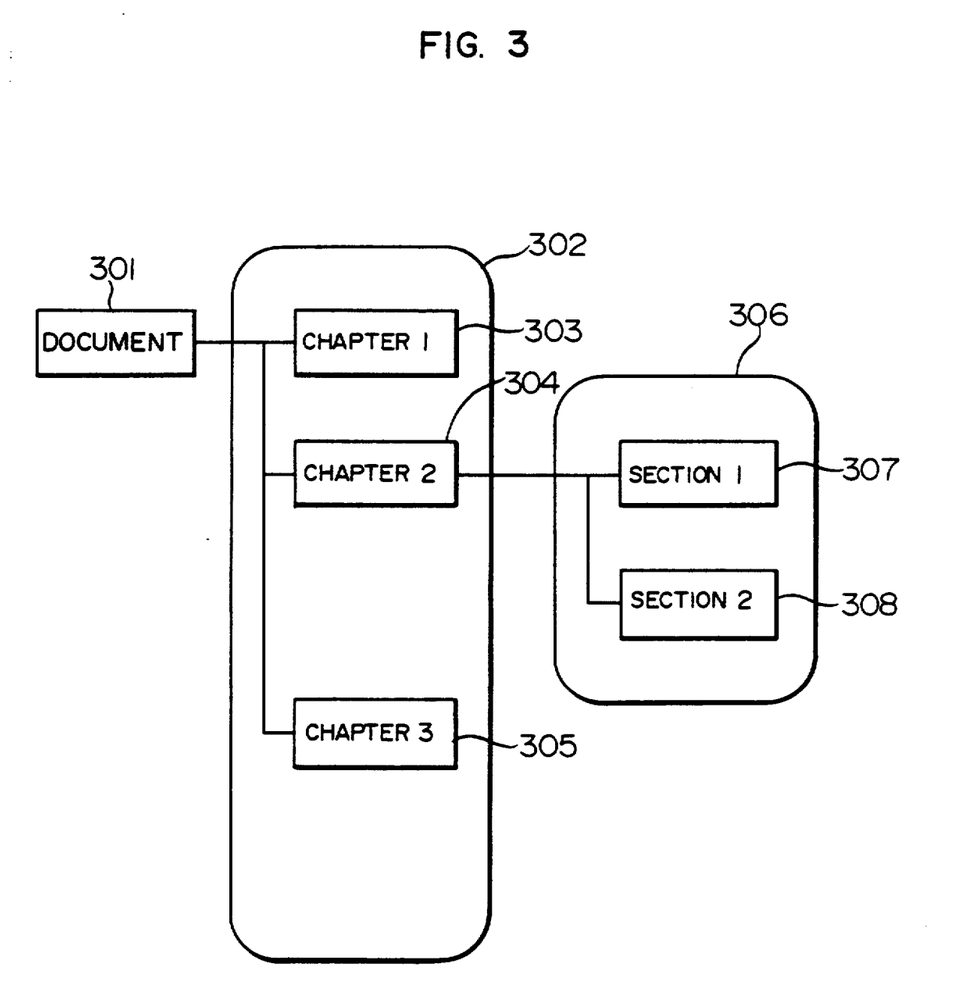
FIG. 3 shows the document structure of the page as shown in FIG. 2 in a hierarchical structure.

FIG. 3 represents the document structure of the page of FIG. 2 by a hierarchical structure. As shown, the document is composed of a three-level hierarchical structure which comprises a first level having a single element 301 representing a document as management concept, second level below the first level 301 having a set 302 of elements 303-305 corresponding to chapters of the document, and a third level below the second level 302 having a set 306 of elements 307 and 308 which correspond to sections of chapter 2.

The first level text 301 corresponds to the entire document and it is automatically prepared when the document is prepared and is not an object of operation by the user of the document editing device. Since the element 301 does not have the same level element, it is an element which has no set.

In accordance with the present invention, the first memory 10 for storing the document having the hierarchical structure as shown in FIG. 3 as the text document data (character data representing the content of the document to be displayed or printed) with a control character indicating change of level of the hierarchical structure and/or a control character indicating the end of element being added at a position in the text data corresponding to the heading, and the second memory 13 (13-1 and 13-2) for storing management information for the respective sets and the respective elements of the sets. When the edited document is to be outputted (displayed or printed), the control character is detected from the text data read from the first memory 10, the heading (serial number and title of the heading) corresponding to the detected control character is read from the second memory 13, and the heading is outputted in place of the control character.

FIG. 4 shows the content of the memory 10 of FIG. 1 (which stores the text character data and control characters) Specifically, it shows a layout of the text data of the document page 201 of FIG. 2. Numerals 401 and 413 (SS.s) denote set starts which indicate that elements of child sets of the elements (document 301 and element 304 of Chapter 2 of FIG. 3) immediately ahead of the positions of SS start from the position of SS. Numeral 402 (SE) denotes set end which indicates that the set of elements (set 306 of the low order sections of Chapter 2 in FIG. 3) behind the position of SE ends at the position of SE. Numerals 403, 414, 415 and 416 (EE) denote element ends which indicate that the elements (element 303 of Chapter 1, element 307 of Section 1, element 308 of Section 2 and element 304 of Chapter 2 in FIG. 3) ahead of the positions of EE end at the positions of EE. Numeral 404 (NL) denotes a new line which indicates start of a new line. The control characters 401 to 403 and 404 are automatically inserted into the text data when the sets and elements ar prepared.

There is no text data in the lines of the headings 202 to 206 of FIG. 2 but only the set start, element end and new line are arranged. When the document page is to be displayed or printed, the headings of the corresponding elements are formed out of the management information in the memory 13. The set end 402 and the preceding element end 403 are not displayed or printed because they do not correspond to the headings of the elements. Numerals 407 to 411 denote character data.

Figure 5:
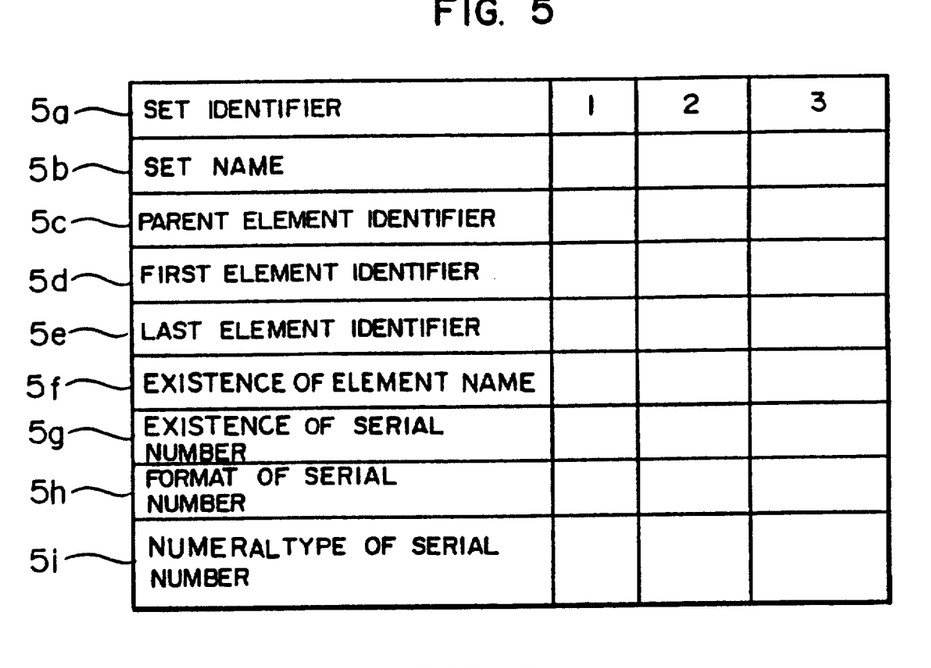
FIGS. 5 and 6 show set management information and element management information stored in the management information memory.

FIG. 5 shows set management information stored in the memory 13-1, which includes the followings.

Set Management Information (5a) SET IDENTIFIER (id) is an identifier ($\neq 0$) assigned to each set (for example, 302 or 306 in FIG. 3) in the order of preparation.

(5b) SET NAME is a name assigned to each set by a user.

(5c) PARENT ELEMENT IDENTIFIER (id) is an identifier assigned to an element which is at next higher level to each set (for example, the element 304 of Chapter 2 of FIG. 3 for the set 306 of the lower level sections of Chapter 2) in the order of preparation. It is "0" if no parent element exists.

(5d) FIRST ELEMENT IDENTIFIER (id) is an identifier of a first element of each set (for example, the element 307 of Section 1 of FIG. 3 for the set 306 of lower level sections of Chapter 2).

(5e) LAST ELEMENT IDENTIFIER (id) is an identifier of a last element of each set (for example, the element 308 of section 2 of FIG. 3 for the set 306 of lower level sections of Chapter 2).

(5f) EXISTENCE OF TITLE indicates whether a title is to be assigned to each element of each set or not.

(5g) EXISTENCE OF SERIAL NUMBER indicates whether a serial number is to be assigned to each element of each set.

(5h) FORMAT OF SERIAL NUMBER indicates format of a serial number of each element of each set (for example, "§" followed by (parent element No.) followed by "." followed by (element No.).

(5i) NUMERAL TYPE OF SERIAL NUMBER indicates numeral type of a serial number of each element of each set (for example, Alabic numerals [1, 2, . . . ], Roman numerals [I, II, . . . , or i, ii, . . . ], Alphabet [A, B, . . . , or a, b, . . . ])

Figure 6:
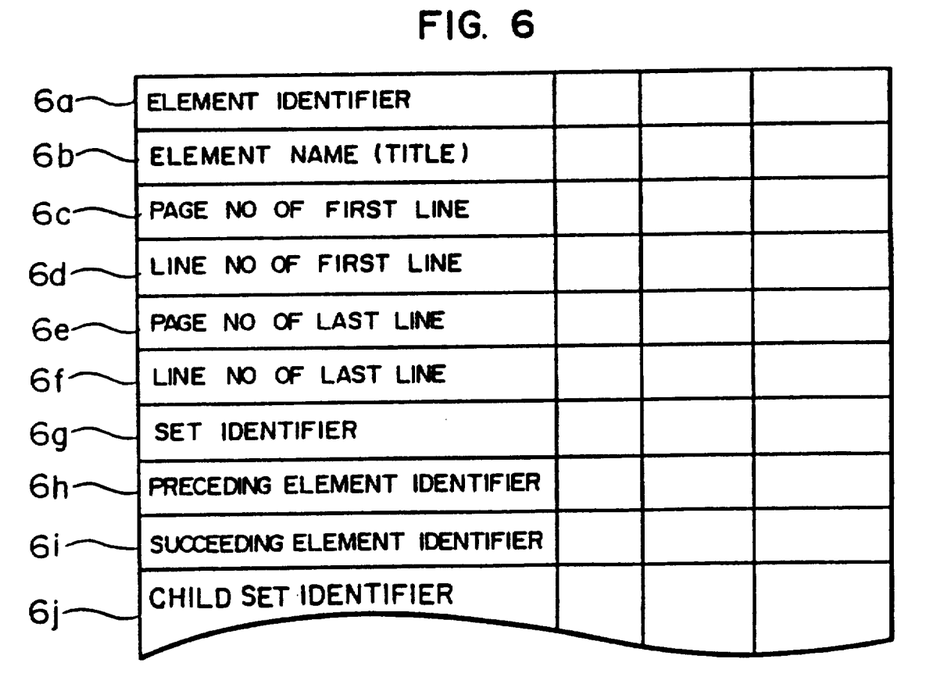

FIG. 6 shows element management information stored in the memory 13-2, which includes the following.

Element Management Information (6a) ELEMENT IDENTIFIER (id) is an identifier (≠0) assigned to each element in the order of preparation. The element identifier of the document 301 of FIG. 3 is "1" (constant).

(6b) ELEMENT NAME (TITLE) is a name (title) assigned to each element by a user.

(6c) PAGE NO. OF FIRST LINE is a page number of a first line of each element. The page number is assigned in the order of page starting from the beginning of the document.

(6d) LINE NO. OF FIRST LINE is a line number of a first line of each element. The line number is assigned in the order of line starting from the first line of the pages.

(6e) PAGE NO. OF LAST LINE is a page number of a last line of each element.

(6f) LINE NO. OF LAST LINE is a line number of a last line of each element.

(6g) SET IDENTIFICER (id) is an identifier of a set to which each element belongs (for example, the set 302 of chapters for Chapter 2 (304) of FIG. 3).

(6h) PRECEDING ELEMENT IDENTIFIER (id) is an identifier of an element which is immediately ahead of each element (for example, Chapter 1 (303) for Chapter 2 (304) of FIG. 3). It is zero if there is no preceding element.

(6i) SUCCEEDING ELEMENT IDENTIFIER (id) is an identifier of an element which is immediately behind each element (for example, Chapter 3 (305) for Chapter 2 (304) of FIG. 3). It is zero if there is no succeeding element.

(6j) CHILD SET IDENTIFIER (id) is an identifier of a set which is at an immediately lower level to each element (for example, the set 306 which is a lower level section of Chapter 2 (304) of FIG. 3). It is zero if there is no subset.

The hierarchical structure of the document such as chapters and sections are represented by the sets and elements which include the above management information. The set names "Chapter" or "Section" may be arbitrarily assigned to the sets by the user, and the element titles such as "SUMMARY OF SYSTEM" or "SPECIFICATION OF HARDWARE" and the serial numbers may also be arbitrarily set by the user. The element serial number (parent element No.) followed by "." followed by (element No.) or "§" followed by (parent element No.) followed by "-" followed by (element No.) and the numeral type used for the set may be arbitrarily selected by the user. Thus, (5b), (5f)–(5i) and (6b) are information which the user may freely set and modify, and other information may be set and modified by a program on the processor.

Figure 7:
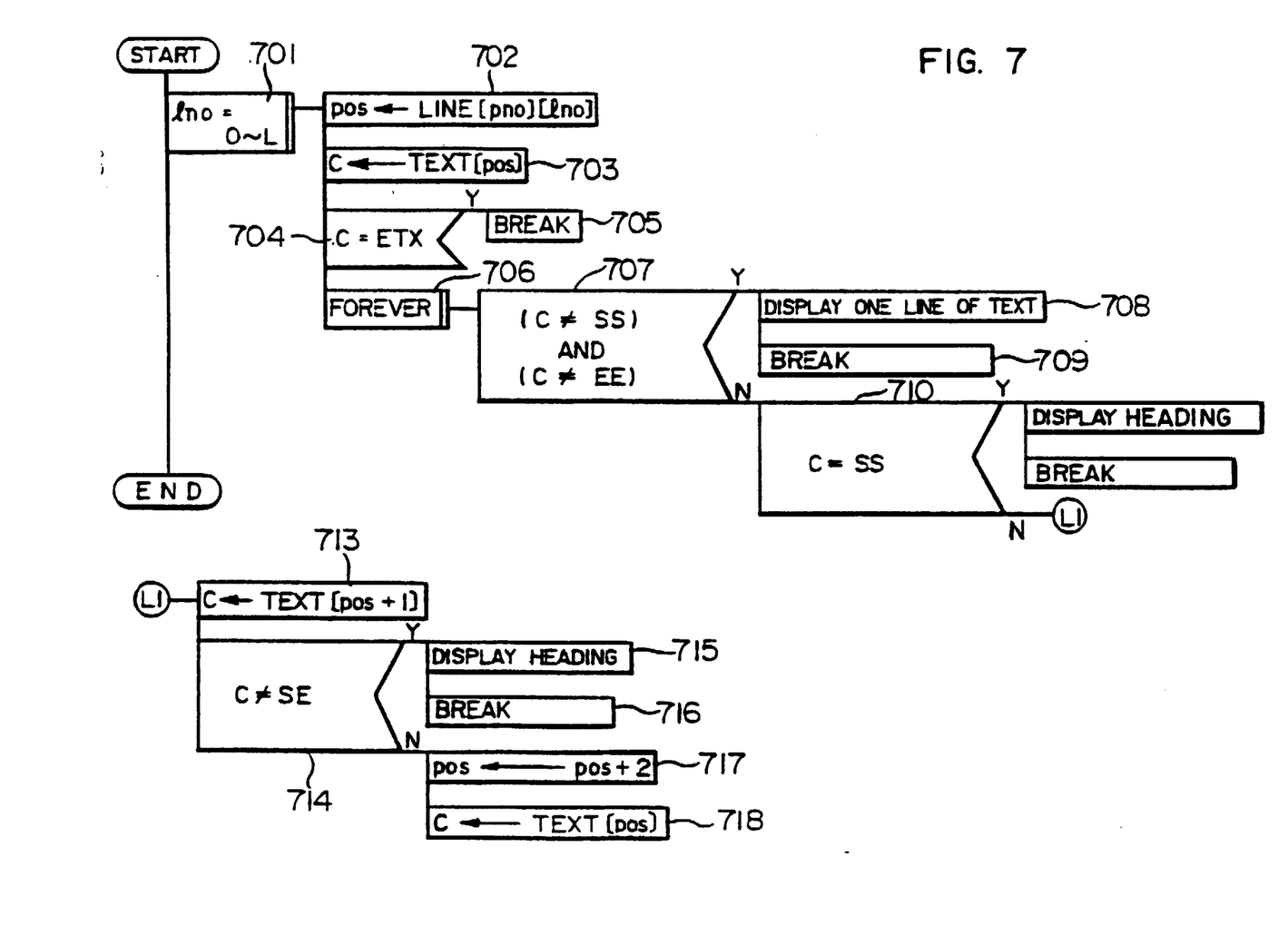
FIGS. 7 and 8 show flowcharts (PAD=Problem Analysis Diagram) for displaying a document page by using the device of the invention.
Figure 8:
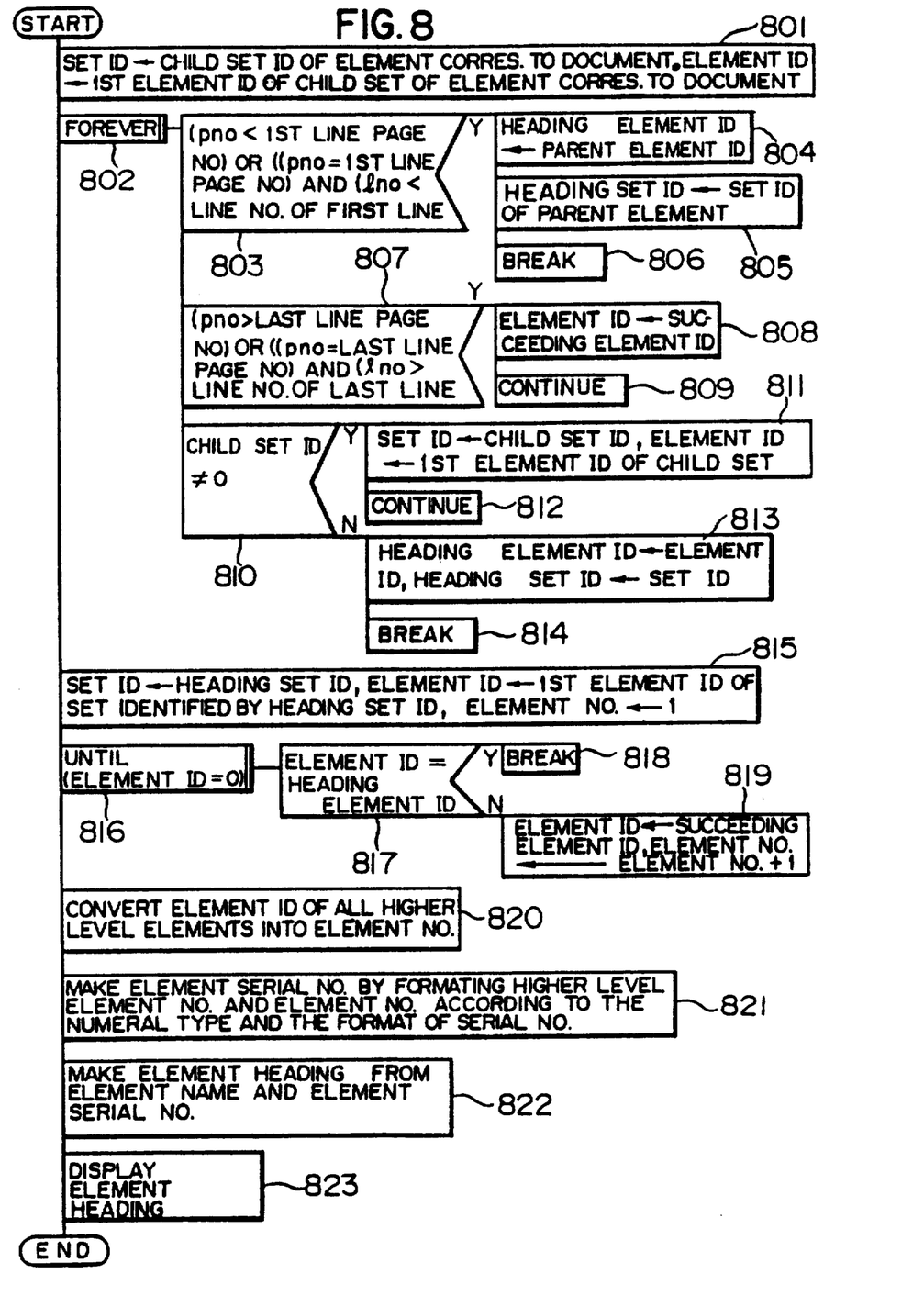

FIGS. 7 and 8 show flowcharts for displaying a document page by using the document editing device of the present invention. In order to simplify the description, it is assumed that all character data and control characters are one-byte data. A step 701 is a loop to repeat steps 702-706 for each of line numbers (lno) O-L, L is a maximum line number in the page. In a step 702, a position (first column of line [pno] [lno]) of the start of the line (lno) of the page (pno) in the entire text data is substituted for a numeric variable (pos) in the memory 12. The (line) has been stored in the document data memory 10 as layout information to the page of the text data. In a step 703, the text data (text [pos]) at the position (pos) is substituted for a character variable (c) in the memory 12. The (text) has been stored in the document data memory 10 as text data. In steps 704 and 705, whether (c) corresponds to the control character ETX (End of Text) indicating the end of text data or not is checked, and if it corresponds, the process is terminated. The (break) in the step 705 means going out of the loop (loop 701). In a step 706, a step 707 is repeated. In the step 707, whether (c) is the set start (SS) or the element end (EE) is checked. This step corresponds to the step by the control character detection unit 14 of FIG. 1. If (c) is other than any of the above control characters, steps 708 and 709 are executed. If (c) is any one of the set start and the element end, a step 710 is executed. In the step 708, the text data from the position (pos) to the position corresponding to the end of the line is determined by two variables (line) and (text) and it is displayed. In the step 709, the process goes out of the loop 706. In the step 710, if (c) is the set start, steps 711 and 712 are executed, and if not, steps 713 and 714 are executed. In the step 711, the heading of the element for the set start is displayed. In the step 712, the process goes out of the loop 706. Details of the steps 711 and 715 will be explained later with reference to FIG. 8. In the step 713, the text data (text [pos+1]) which is one column ahead of the position (pos) is put into (c). In the step 714, if (c) is not the set end, the heading of the element corresponding to the element end is displayed in the step 715. In the step 716, the process goes out of the loop 706. If (c) is the set end, the text data (text [pos]) (=element end) and text [pos+1] (=set end) do not correspond to the heading of the element. Thus, (pos) is incremented by two in a step 717, and the text data (text [pos]) at that position is put into (c) in the step 718. Then, the loop 706 is repeated.

FIG. 8 shows a detail of the heading display step (steps 711 and 715) of FIG. 7. Steps 801-822 correspond to the operation of the heading preparation unit 15 of FIG. 1. It is assumed that the management information given by 5f and 5g in FIG. 5 indicates the presence of the title and serial number of the element. In the steps 801 and 802, set identifier and element identifier of the element corresponding to the heading line (page number (pno) and line number (lno)) (the element is hereinafter called a required element and the set identifier and element identifier are hereinafter called heading set identifier and heading element identifier, respectively) are determined. In the step 801, the set identifier of the child set of the element (element identifier = 1) corresponding to the document is substituted for the set identifier, and the first element identifier of the set is substituted for the element identifier. The set identifier, element identifier, heading set identifier and heading element identifier are numeric variables in the memory 12. In the step 802, steps 803-810 are repeated. In the step 803, the position (page number, line number) of the first line of the element designated by the current element identifier (hereinafter called a current element) is determined from the element management information memory 13-2, and whether it is behind the heading line position (pno, lno) or not is checked. If it is behind, the required element is not a succeeding element of the current element. Thus, in the steps 804 and 805, the element identifier and set identifier of the parent element of the set to which the current element belong are determined from the set management information memory 13-1 and the element management information memory 13-2 and they are assigned as the heading element identifier and heading set identifier, respectively.

In the step 806, the process goes out of the loop 802. The steps 804 and 805 are executed after it has been determined in the steps 811 et seq that the heading line corresponds to the element of the child set. In the step 807, whether the last line position of the current element is ahead of the heading line position or not is checked. If it is ahead, the required element is one of the succeeding elements of the current element. Thus, in the step 808, the succeeding element identifier of the current element is substituted for the element identifier. In the step 809, the process returns to the step 803. The (continue) in the step 809 means to return to the start of the loop. The step 810 is executed when the heading line is between the first line and last line of the current element. Since the required element may be an element of a lower level set to the current element, the presence or absence of a child set is first examined. If the child set identifier is not zero (indicating the presence of a child set), the child set identifier and the child set first element identifier are substituted for the set identifier and element identifier, respectively. Then, the process returns to the step 803. If the subset identifier is zero the current element is the required element. Thus, in the step 813, the element identifier and the set identifier of the current element are substituted for the heading element identifier and heading set identifier. In the step 814, the process goes out of the loop 802. In the steps 815 and 816, the element number of the element determined in the steps 801 and 802 are determined. In the step 815, the heading set identifier and the first element identifier of the set designated by the heading set identifier are set as the set identifier and element identifier, respectively, and the element number is set to one. The element number is a numeric variable in the memory 12. In the step 816, the step 817 is repeated for each of the elements from the first element to the last element of the set identified by the heading set identifier. (The termination condition is "element identifier=0" because it corresponds to the fact that the succeeding element identifier to the last element is "0"). In the step 817, if the element identifier of the current element is equal to the heading element identifier, the process goes out of the loop 816 in the step 818. If it is not equal, the succeeding element identifier of the current element is substituted for the element identifier in the step 819, and the element number is incremented by one and the loop 816 is repeated. In the step 820, the element identifiers of all elements (excluding the element corresponding to the document) which are at the higher levels than that of the element determined in the steps 801 and 802 are determined from the set management information memory 13-1 and element management information 13-2, and they are converted into the element numbers as are done in the steps 815-819. In the step 821, the higher level element numbers and element number are formated according to the numeral types and formats of the serial number which are definition information of the set in order to prepare the element serial number. In the step 822, the element heading is prepared based on the element title and element serial number. In the step 823, it is displayed. When no element title is set, the element serial number may be used as the element heading in the step 822. When no element serial number is set, the steps 801-821 may be omitted and the element title may be used as the element heading in the step 822.

Figure 9:
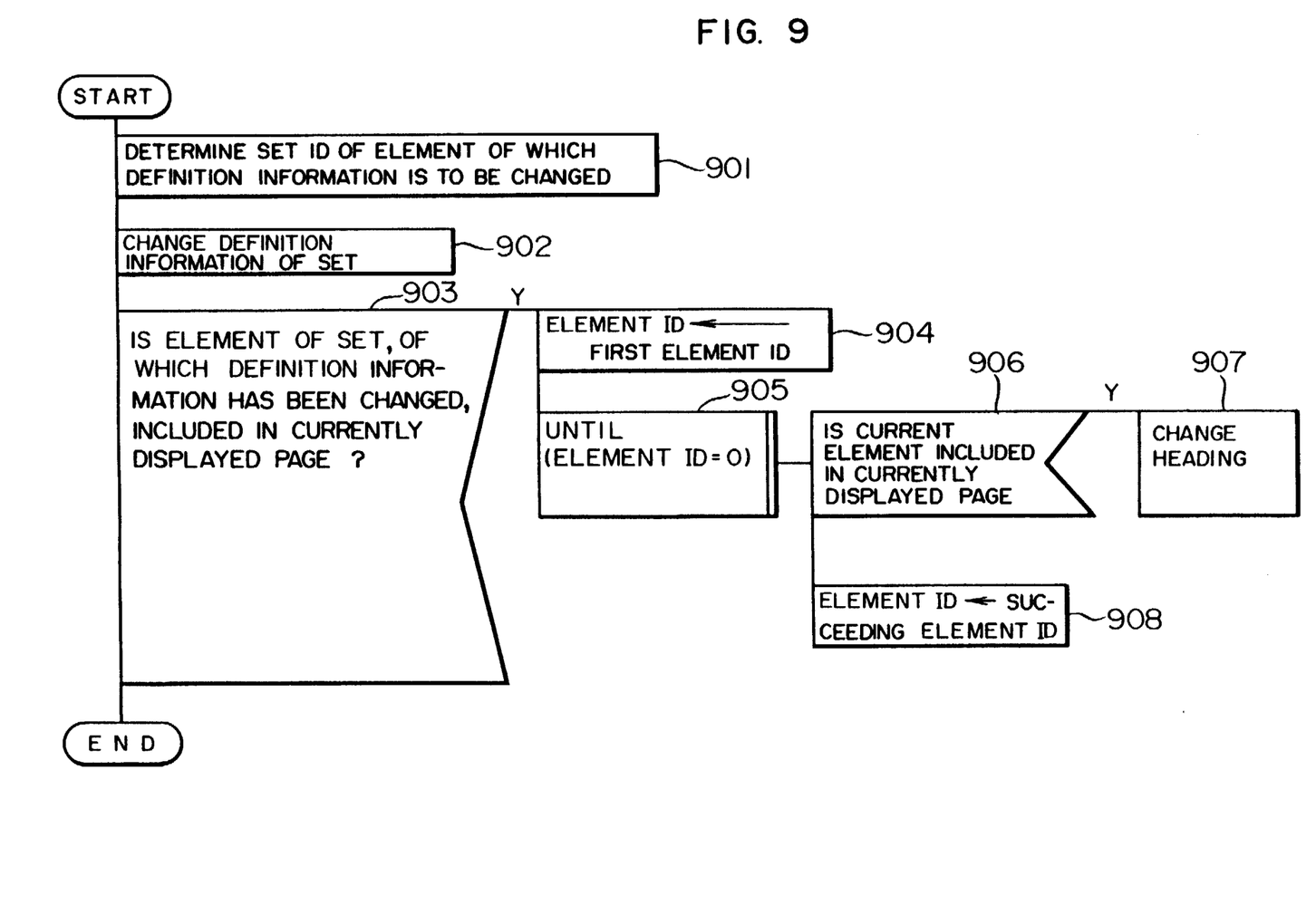
FIG. 9 shows a flow chart for modifying the display of the document page when the definition information including the element title and serial number is to be modified.

FIG. 9 shows a flowchart for modifying the display of the document page when the definition information including the element title and serial number is to be modified. In a step 901, the set identifier of the element designated by the user whose definition information is to be modified is determined. In a step 902, the definition information of the set is modified as designated by the user. In a step 903, whether the element of the set whose definition information has been modified is included in the page currently displayed on the display 7 or not is examined based on the first and last line positions of each element. If it is not included, the process is terminated. In steps 904-908, whether each element of the set is currently displayed or not is examined, and if it is displayed, the headings of that element and all elements of all lower level sets are modified. In a step 904, the first element identifier of the set is substituted for the element identifier. In a step 905, the steps 906 and 908 are repeated for each of the elements from the first element to the last element (the termination condition is "element identifier=0" because it corresponds to the fact that the succeeding element identifier of the last element is zero). In the step 906, whether the current element is included in the currently displayed page or not is examined. If it is not included, the headings of that element and all elements of all lower level sets are modified in a step 907. The headings are prepared and displayed in accordance with the modified definition information, as are done in the steps 815-823 of FIG. 8. In a step 908, the succeeding element identifier of the current element is substituted for the element identifier, and the loop 905 is repeated.

The hierarchical structure of the document shown in FIG. 3 is traced in the order of the set levels and element numbers to output the headings of all elements so that a table of contents of the document may be prepared. When the definition information including the element title and serial number is modified, the headings of all elements of that set and all elements of all lower order sets are modified so that the table of contents is automatically modified.

In the present embodiment, the definition information of the set consists of only existence of element title and serial number, format and numeral type, although it may also include information on whether the element numbers of other higher level elements are to be included in the serial number or not, and whether a page is changed at the last line of the element. The definition information on the existence of the serial number may be provided to the element so that the absence of the serial number may be designated to some elements of the set whose existence of serial number is designated as presence.

The text data is used as document data in the present embodiment. When other kinds of data such as graphic, table, image and graph are mixedly present, the document page may be managed by dividing it into rectangular areas one for each attribute and the attribute data as well as positions, sizes, attributes of the areas and addresses of the attribute data may be stored in the document data memory 10. The area number (for each page) may be numbered among the layout information of the text data and the position information of the first and last lines of the elements, and the line number may be assigned for each area. A loop to trace all text areas in the page (areas in which the text data is present) may be provided as outer loop of the loop 501 of FIG. 5.

In accordance with the present invention, when the definition information on the titles of chapters or sections of the document and the serial numbers are to be collectively changed, the users need only designate the modification of the definition information on the set which manage collectively the information of all the elements. When the headings of the chapters and sections are to be modified due to the modification of the definition information, only the control character and new line for modifying the set and elements are arranged on the lines corresponding to the heading lines and they are substituted for the headings when the document page is displayed and printed. Accordingly, the text data per se need not be modified and the document page need only be redisplayed or reprinted.

I claim:

1. A document editing device for editing a document having a plurality of headings, said document being divided into a plurality of elemental documents of a hierarchical structure, each elemental document including a parent elemental document in a first hierarchical level and child elemental documents included in said parent elemental document, said child elemental documents being in a second hierarchical level which is lower than said first hierarchical level, each of the elemental documents having a heading with a heading number, the device comprising:

a first memory for storing text data with control characters including first control characters, second control characters, and new line characters, said first control characters indicating transition of the first hierarchical level of said parent elemental document changes to said second hierarchical level of said child elemental document by a position of the first control character, and said second control characters indicating that a parent elemental document immediately ahead of said second control character ends at the position of the second control character, the new line characters each indicating that a new line in said parent or child elemental document is to be started from said new line character, said control characters being located at positions in the text data corresponding to the headings;

a second memory for storing management information including (i) a sequence of characters of each heading and (ii) data indicative of the heading number corresponding to each of the hierarchical levels of said elemental documents; and, a processor including:

a first means comprising a means for reading the text data with control characters from said first memory and a means for detecting each control character included within the read text data with control characters, and a second means which is initiated in response to the detection of each control character by the means for detecting for determining the heading number of the heading corresponding to each control character and for replacing each control character with the corresponding heading including the corresponding heading number and the character sequence by referring to the management information stored in the second memory, such that the processor outputs the text data with the corresponding heading to an output device.

2. A document editing device according to claim 1 wherein said management information is stored in said second memory as first management records and second management records, said first management records including a first identifier for indicating the hierarchical level of each elemental document, a second identifier for indicating said parent elemental document to said child elemental document, a third identifier for indicating one child elemental document at a first position from a plurality of child elemental documents included in a parent elemental document, and a fourth identifier for one child elemental document at a last position from a plurality of child elemental documents included in a parent elemental document, and said second management records including, an identifier assigned to each elemental document in the order of preparation, the character sequence of each of the headings, a page number of a first line in each elemental document, a line number of the first line in each elemental document, a parent elemental document identifier of a parent elemental document to which each child elemental document belongs, a preceding elemental document identifier for identifying the elemental document which is immediately ahead of each elemental document, a succeeding elemental document identifier for identifying the elemental document which is immediately behind each elemental document, and a child elemental document identifier for identifying a lower level elemental document to the parent elemental document.

3. A document editing device for editing a document having a plurality of headings, said document being divided into a plurality of elemental documents of a hierarchical structure, each elemental document including a parent elemental document in a first hierarchical level and child elemental documents included in said parent elemental document, said child elemental documents being in a second hierarchical level which is lower than said first hierarchical level, each of the elemental documents having a heading with a heading number, the device comprising:

a first memory for storing text data with control characters including first control characters, second control characters, and new line characters, said first control characters including third control characters and fourth control characters, said third control characters indicating that said first hierarchical level changes to said second hierarchical level, a position of the third control characters and said fourth control characters indicating that said second hierarchical level changes to said first hierarchical level, and said second control characters indicating that a parent element document immediately ahead of one of the said second control characters ends at the position of the one second control character, each new line character being included in at least one of the first, second, third and fourth control characters, the new line characters each indicating that a new line in said parent or child elemental document is to be started from said new line characters, said control characters being located at positions in the text data corresponding to the headings;

a second memory for storing management information including (i) a sequence of characters of each heading and (ii) data indicative of the heading number corresponding to each of the hierarchical levels of said elemental documents; and, a processor including:

a first means comprising a means for reading the text data with control characters from said first memory and a means for detecting each control character included within the read text data with control characters, and a second means which is initiated in response to the detection of each control character by the means for detecting for determining the heading number of the heading corresponding to each control character and for replacing each control character with the corresponding heading including the corresponding heading number and the sequence of characters by referring to the management information stored in the second memory, such that the processor outputs the text data with the corresponding headings to an output device.

4. A document editing device according to claim 3, wherein said management information is stored in said second memory as first management records and second management records, said first management records including a first identifier for indicating hierarchical level of each elemental document, a second identifier for indicating said parent elemental document to said child elemental document, a third identifier for indicating a child elemental document at a first position in a plurality of child elemental documents being included in a parent elemental document, a fourth identifier for indicating a child elemental document at a last position in a plurality of child elemental documents being included in a parent elemental document, a fifth identifier for indicating a name according to level of each elemental documents, a sixth identifier for indicating a numeral type of each heading numbers, and a seventh identifier for indicating a format of each of the heading numbers, and said second management records including an identifier assigned to each elemental document in the order of preparation, character sequence of each of the headings, a page number of a first line in each elemental document, a line number of the first line in each elemental document, a page number of a last line in each elemental document, a line number of the last line in each elemental document, a parent elemental document identifier of a parent elemental document to which each child elemental document belongs, a preceding elemental document identifier for identifying the elemental document which is immediately ahead of each elemental document, a succeeding elemental document identifier for identifying the elemental document which is immediately behind each elemental document, and a child elemental document identifier for identifying a lower level elemental document to the parent element document.

* * * * *

UNITED STATES PATENT AND TRADEMARK OFFICE
CERTIFICATE OF CORRECTION

PATENT NO. : 4,996,665
DATED : February 26, 1991
INVENTOR(S) : Takaaki Nomura

It is certified that error appears in the above-identified patent and that said Letters Patent is hereby corrected as shown below:

Claim 3, column 10, line 42, delete "," and insert therefor --at--.
Line 42 should read as follows:
"level at a position of the third control characters and"

Signed and Sealed this

Twenty-fifth Day of August, 1992

Attest:

DOUGLAS B. COMER

*Attesting Officer*   *Acting Commissioner of Patents and Trademarks*